United States Patent [19]

Eastwood

[11] 3,841,455

[45] Oct. 15, 1974

[54] CLUTCH WITH ENGINE OIL COOLING

[75] Inventor: Thomas Eastwood, Huddersfield, England

[73] Assignee: David Brown Tractors Limited, Huddersfield, England

[22] Filed: Nov. 20, 1973

[21] Appl. No.: 417,571

Related U.S. Application Data

[63] Continuation of Ser. No. 197,703, Nov. 11, 1971, abandoned.

[30] Foreign Application Priority Data

Nov. 24, 1970 Great Britain .................. 5529/70

[52] U.S. Cl. ........................... 192/113 B, 192/48.8
[51] Int. Cl. ........................................ F16d 13/72
[58] Field of Search ........ 192/113 B, 70.12, 107 M, 192/48.8

[56] References Cited
UNITED STATES PATENTS

| | | | |
|---|---|---|---|
| 1,122,119 | 12/1914 | Huff | 192/70.12 |
| 2,733,798 | 2/1956 | Almen et al. | 192/70.12 X |
| 3,145,816 | 8/1964 | Lorean et al. | 192/113 B X |
| 3,212,611 | 10/1965 | Ruoff et al. | 192/48 |
| 3,385,412 | 5/1968 | Isgren | 192/113 B |
| 3,435,935 | 4/1969 | Warman | 192/113 B X |

Primary Examiner—Benjamin W. Wyche
Attorney, Agent, or Firm—Norris & Bateman

[57] ABSTRACT

A wet clutch for a tractor or other land vehicle is supplied with oil bled from the engine's pressurised lubrication system and discharged in a jet from an orifice at the rear end of the engine's crankshaft. The jet enters an axial bore in a driven shaft of the clutch and is expelled from said bore through radial holes by centrifugal force to lubricate and cool the clutch plate or plates. The oil returns to the engine's sump by way of peripheral apertures in the flywheel and the clutch housing secured thereto and thence by way of an opening between the clutch casing and said sump.

11 Claims, 1 Drawing Figure

PATENTED OCT 15 1974  3,841,455
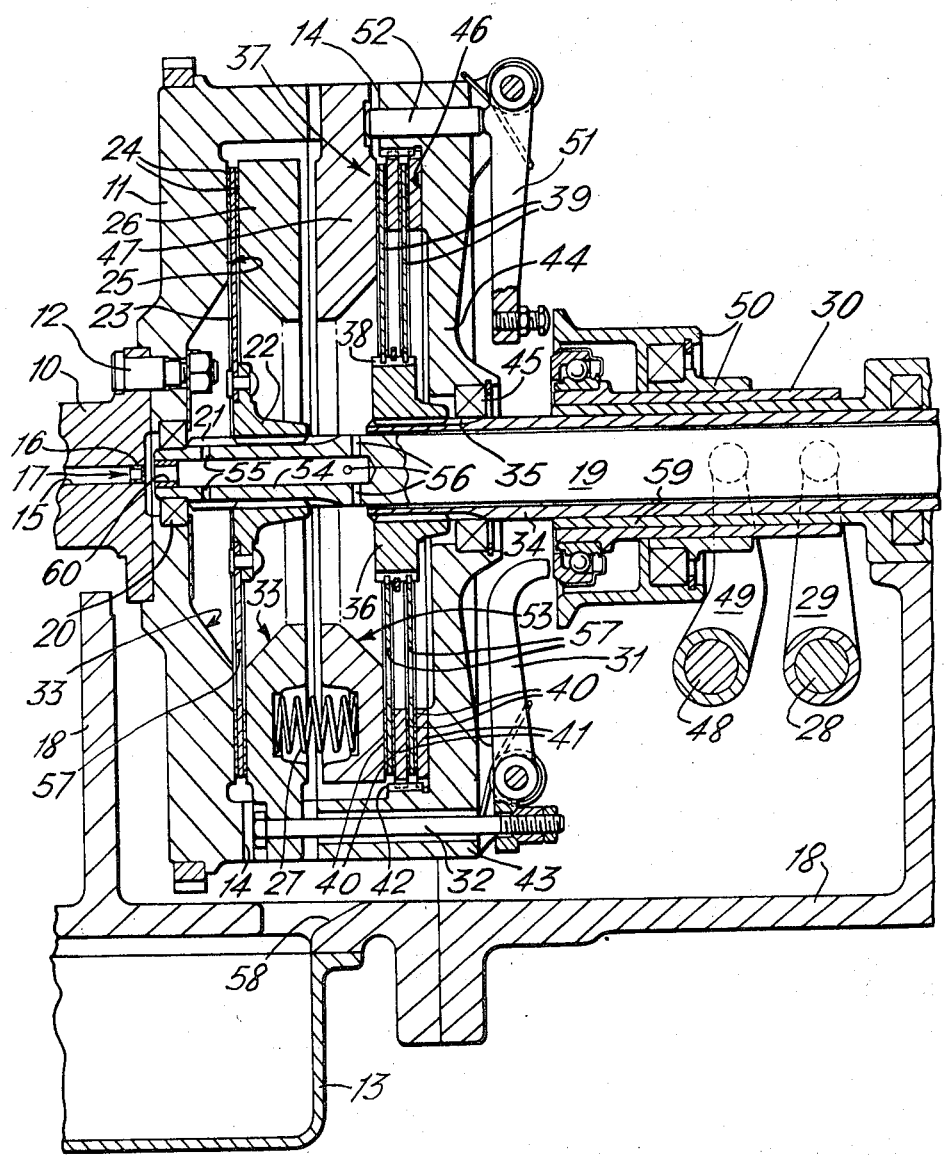

CLUTCH WITH ENGINE OIL COOLING

This is a continuation, of application Ser. No. 197,703 filed Nov. 11, 1971, and now abandoned.

BACKGROUND OF INVENTION

The invention relates to engine/clutch combinations, particularly but not exclusively for land vehicles, and has for its object to enable a wet clutch, which requires a copious supply of oil for lubrication and cooling at times of engagement and disengagement, to be employed without the need for a separate pump to supply said oil.

SUMMARY OF INVENTION

According to the invention, an engine/clutch combination includes an engine crankshaft, a flywheel secured to the crankshaft, a clutch casing enveloping the flywheel, a driven shaft co-axial with the crankshaft, at least one clutch plate mounted on the driven shaft, an axially movable pressure plate between which and the flywheel the clutch plate can be frictionally engaged, a conventional engine lubricating oil conduit in the crankshaft, an engine oil pump supplying oil under pressure to the conduit from a sump, an orifice in that end of the crankshaft adjacent the driven shaft which communicates with the conduit and is co-axial with the crankshaft, an axial bore in that end of the driven shaft adjacent the crankshaft for receiving a jet of oil from the orifice, radial holes in the driven shaft communicating with the bore therein for centrifugally directing oil to the clutch plate, and an opening between the bottom of the clutch casing and the engine sump to permit oil to return to the latter.

BRIEF DESCRIPTION OF DRAWING

A preferred embodiment of the invention will now be described, by way of example only, with reference to the accompanying Drawing which shows a sectional side elevation of a clutch mechanism and an associated engine flywheel and sump.

DESCRIPTION OF PREFERRED EMBODIMENT

Referring now to the Drawing, an agricultural tractor has a six-cylinder diesel engine including a crankshaft 10, a flywheel 11 secured by bolts 12 to the crankshaft 10, a sump 13 and a lubricating oil pump (not shown) drawing oil from the sump 13. The crankshaft 10 contains a conventional lubricating oil conduit (not shown), and a hole 15 is drilled in that end of the crankshaft 10 to which the flywheel 11 is secured, said hole joining said conduit and being co-axial with the crankshaft 10. Secured in the outer end of the hole 15 is a plug 16 containing an orifice 17 which is also co-axial with the crankshaft 10. A clutch casing 18 which envelops the flywheel 11 is secured to the engine, and contains a power take-off shaft 19 co-axial with the crankshaft 10, that end of the power take-off shaft 19 adjacent the crankshaft 10 being supported in a bearing 20 housed in the flywheel 11. The power take-off shaft 19 is provided with external splines 21 near its end adjacent the crankshaft 10, on which there is mounted a hub 22 to which a single clutch plate 23 is rivetted. The plate 23, which has so-called "paper" linings 24 comprising thin impregnated mats of heat-resistant fibre, is frictionally engaged between a face 25 on the flywheel 11 and a pressure plate 26 by a set of helical compression springs 27, and can be disengaged by conventional means comprising a hand lever (not shown), a rotatable shaft 28 on which said lever is secured, a forked arm 29 also secured on the shaft 28, a sleeve 30 slidable axially on a fixed sleeve 59 by the arm 29, first class levers 31 movable by the sleeve 30, and pull rods in the form of bolts 32 connecting the levers 31 to the pressure plate 26. The face 25 and pressure plate 26 have conical surfaces 33, radially inward of the linings 24 on the clutch plate 23, for a purpose hereinafter referred to.

Surrounding the power take-off shaft 19 is a sleeve 34 rotatable independently thereof which constitutes the input shaft of the tractor's power transmission gearbox. That end of the sleeve 34 adjacent the crankshaft 10 is provided with external splines 35 on which there is mounted the hub 36 of a multi-plate clutch indicated generally at 37. The hub 36 has external splines 38 carrying two clutch plates 39 which have "paper" linings 40 and are interleaved with two unlined clutch plates 41 carried by internal splines 42 formed in a housing 43 bolted to the flywheel 11. The flywheel 11 and the housing 43 contain peripheral apertures 14 and said housing includes an inwardly directed flange 44 at its end remote from the flywheel 11, said flange housing a bearing 45 which supports the sleeve 34 near the front end thereof on that side of the hub 36 remote from the crankshaft 10. The plates 39, 41 of the multiplate clutch 37 are frictionally engaged between a face 46 on the flange 44 and a pressure plate 47 by the aforementioned set of springs 27 and can be disengaged by conventional means comprising a foot pedal (not shown), a rotatable shaft 48 on which said pedal is secured, a forked arm 49 also secured on the shaft 48, a sleeve assembly 50 surrounding the sleeve 30 and slidable axially by the arm 49, second class levers 51 movable by the sleeve 50, and push rods in the form of plungers 52 disposed between the levers 51 and the pressure plate 47. The pressure plate 47 has a conical surface 53, radially inward of the linings 40 on the two clutch plates 39 carried by the hub 36, for a purpose hereinafter referred to.

An axial bore 54 is formed in that end of the power take-off shaft 19 adjacent the crankshaft 10, and two sets 55 and 56 of diametrically-opposed radial holes in the power take-off shaft 19 communicate with said bore. The mouth of the bore 54 is restricted by an annular member 60 secured therein. One set 55 of said radial holes is formed on the crankshaft side of the hub 22, and the other set 56 of said radial holes is formed between the hub 22 and that end of the sleeve 34 adjacent the crankshaft 10. Holes 57 are provided in each of the clutch plates 23 and 39, and an opening 58 is formed between the bottom of the clutch casing 18 and the engine sump 13.

In operation, a metered amount of the oil discharged by the engine's lubricating oil pump (not shown) is expelled in the form of a jet from the orifice 17 in the crankshaft 10 when the engine is running, and this oil is received by the axial bore 54 in the power take-off shaft 19 and expelled by centrifugal force through the two sets 55 and 56 of radial holes to lubricate and cool the two clutches. The conical surfaces 33 and 53 on the flywheel 11 and the two pressure plates 26 and 47 assist in directing the flow of oil to the plates 23 and 39 of the two clutches, and the holes 57 in the clutch plates 23 and 39 permit the oil to reach all of their working surfaces. Oil returns to the engine sump 13 by way of the peripheral apertures 14 and the opening 58 between the clutch casing 18 and said sump.

In a modification, the lined clutch plates 23 and 39 have sintered bronze instead of "paper" linings.

What I claim is:

1. An engine/clutch combination including an engine crankshaft, a flywheel secured to the crankshaft, a clutch housing secured to the flywheel for rotation therewith, a fixed clutch casing enveloping the combined flywheel and clutch housing, a driven shaft coaxial with the crankshaft, at least one clutch plate mounted on the driven shaft within the combined flywheel and clutch housing, an axially movable pressure plate within the combined flywheel and clutch housing between which pressure plate and the flywheel the clutch plate can be frictionally engaged, an engine lubricating oil conduit in the crankshaft, means supplying oil under pressure to the conduit from a sump, an orifice in that end of the crankshaft adjacent the driven shaft which communicates with the conduit and is coaxial with the crankshaft, an axial bore in that end of the driven shaft adjacent the crankshaft for receiving a jet of oil from the orifice, at least one radial hole in the driven shaft communicating with the bore therein for centrifugally directing oil to a chamber bounded by said flywheel and said clutch plate, at least one peripheral drain aperture in the combined flywheel and clutch housing to permit oil to pass from said chamber over said clutch plate and thence directly from the periphery of said housing directly to said casing, and an opening between the bottom of the clutch casing and the engine sump to permit oil to return to the latter.

2. An engine/clutch combination according to claim 1, wherein a single clutch plate is provided on the driven shaft.

3. An engine/clutch combination according to claim 1, wherein a sleeve surrounding the driven shaft is rotatable independently thereof, at least one clutch plate mounted on the sleeve within the combined flywheel and clutch housing is frictionally engageable independently of the clutch plate on the driven shaft by another axially movable pressure plate within the combined flywheel and clutch housing, and at least one further radial hole in the driven shaft directs oil centrifugally from the bore in said shaft to the clutch plate on the sleeve.

4. An engine/clutch combination according to claim 3, wherein a multi-plate clutch is provided on the sleeve.

5. An engine/clutch combination according to claim 1, wherein the flywheel and the pressure plate have conical internal surfaces to assist in directing the flow of oil to the clutch plate.

6. An engine/clutch combination according to claim 1, wherein the clutch has so-called "paper" linings.

7. An engine/clutch combination according to claim 1, wherein the clutch has sintered bronze linings.

8. An engine/clutch combination according to claim 3, wherein the flywheel and the pressure plates have conical internal surfaces to assist in directing the flow of oil to the clutch plates.

9. An engine/clutch combination according to claim 3, wherein each clutch has so-called "paper" linings.

10. An engine/clutch combination according to claim 3, wherein each clutch has sintered bronze linings.

11. An engine/clutch combination as defined in claim 1, wherein said orifice means comprises an insert member forming a flow restriction region in said end of said crankshaft conduit.

* * * * *